United States Patent [19]
Dado et al.

[11] Patent Number: 6,107,401
[45] Date of Patent: Aug. 22, 2000

[54] PROCESS FOR PRODUCING AMINE FUNCTIONAL DERIVATIVES OF POLY (VINYL ALCOHOL)

[75] Inventors: Gregory Paul Dado, Emmaus; Kevin Rodney Lassila, Macungie; Kenneth Merle Kem, Emmaus, all of Pa.

[73] Assignee: Air Products and Chemicals, Inc., Allentown, Pa.

[21] Appl. No.: 09/048,593

[22] Filed: Mar. 26, 1998

[51] Int. Cl.[7] .................................. C08F 8/00; C08F 8/12
[52] U.S. Cl. ..................... 525/61; 524/503; 524/557; 525/58; 525/375
[58] Field of Search ............... 525/61, 375, 59, 525/58; 524/503, 557

[56] References Cited

U.S. PATENT DOCUMENTS

| | | | |
|---|---|---|---|
| 3,457,327 | 7/1969 | Matsubayashi et al. | 260/859 |
| 4,124,400 | 11/1978 | Morgan et al. | 106/15 FP |
| 4,780,518 | 10/1988 | Ceaser | 527/300 |
| 5,104,933 | 4/1992 | Shu | 525/59 |
| 5,380,403 | 1/1995 | Robeson | 162/147 |
| 5,397,436 | 3/1995 | Robeson et al. | 162/158 |
| 5,409,886 | 4/1995 | Moriyasu et al. | 504/283 |
| 5,667,773 | 9/1997 | Farrar et al. | 424/78.05 |

*Primary Examiner*—Judy M. Reddick
*Attorney, Agent, or Firm*—Russell L. Brewer

[57] ABSTRACT

This invention relates to a process for producing an aminoalkylal derivative of polymer containing a plurality of polymerized vinyl alcohol units which are vicinal, preferably a process for producing the 4-aminobutyral of poly (vinyl alcohol). The improved process for the aminoacetalization of such polymers described herein comprises reacting a 5 of 6 member cyclic imine of the structure

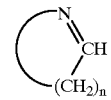

wherein n is an integer from 3 to 4 with the polymer containing a plurality of polymerized vinyl alcohol units. In a preferred reaction, 1,2-pyrroline is reacted with the polymer containing polymerized vinyl alcohol units under acidic conditions. Preferably the reaction is carried out by a slurry phase process employing a non solvent carrier such as methanol for the poly(vinyl alcohol). The reaction scheme for preparing the 4-aminobutyral of poly(vinyl alcohol) may be characterized by the following equation.

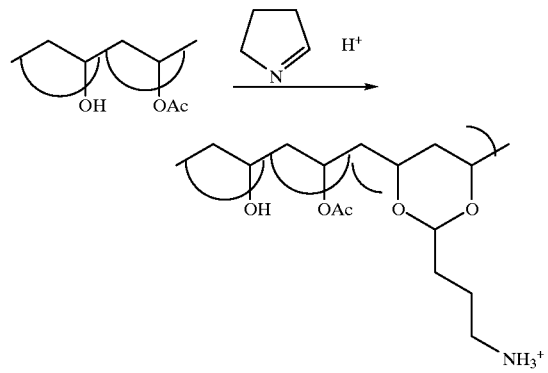

12 Claims, No Drawings

PROCESS FOR PRODUCING AMINE FUNCTIONAL DERIVATIVES OF POLY (VINYL ALCOHOL)

BACKGROUND OF THE INVENTION

Amine functional, water soluble polymers are of considerable interest because of their utility in a variety of applications, including wastewater treatment, papermaking, and enhanced oil recovery. Common classes of amine functional water soluble polymers are the amine functional poly(vinyl alcohols). There are two methods which are generally used to produce amine functional poly(vinyl alcohols), one including the polymerization of vinyl esters and amide functional monomers followed by hydrolysis of the ester and the amide group and the other involving the post-modification of poly(vinyl alcohols). An example of a polymer which can be prepared by the first method is one involving the copolymerization of vinyl acetate and N-vinyl formamide followed by hydrolysis, thereby converting the acetate functionality to hydroxyl functionality and the formamide functionality to amine functionality. Another form of vinyl alcohol/amine copolymer is obtained by polymerizing vinyl acetate and allyl amine and then hydrolyzing the ester group to hydroxyl functionality. An advantage of this method is that well-defined levels of amine functionality can be imparted to the copolymer.

Post-modification of poly(vinyl alcohols) is an alternative method for the preparation of amine functional poly(vinyl alcohol). This method is attractive because it permits the use of a wide variety of existing poly(vinyl alcohols) having differing molecular weights, hydrolysis levels, compositional content and the like. Further, adjustable amine levels can be obtained by single-step batch processes.

A product which is widely known and which may be used in numerous applications is known as the 4-aminobutyral derivative of poly(vinyl alcohol). It has been prepared by the reaction of 4-aminobutyraldehyde dimethyl acetal (ABAA) with PVOH in the presence of an acidic mixture of water. The aqueous process suffers from several disadvantages. First, the reaction becomes viscosity limited at high poly (vinyl alcohol) molecular weights. Second, isolation of the polymer from water is difficult and third, unreacted ABAA and/or by-products cannot be removed in a feasible manner.

The following patents are representative of methods for producing amine functional poly(vinyl alcohols) and the 4-aminobutyral of poly(vinyl alcohol):

U.S. Pat. No. 3,457,327 discloses polyurethane compositions containing amino-acetalized poly(vinyl alcohol) for use in producing fibers, films, etc. Example 2 shows the reaction of p-(dimethylamino)benzaldehyde with poly(vinyl alcohol).

U.S. Pat. No. 5,104,933 discloses the formation of amine terminated poly(vinyl alcohols) by reacting acrylamide with poly(vinyl alcohol). Acrylonitrile and methacrylonitrile are also suggested as being suitable for forming amine functional poly(vinyl alcohols). These products are intermediate to the primary amine functional poly(vinyl alcohols) with conversion to the primary amine functional poly(vinyl alcohols) being effected by known procedures.

U.S. Pat. No. 5,397,436 discloses various amine functional poly(vinyl alcohols) for use as wet strength additives for cellulosic papers. Example 35 shows the reaction of poly(vinyl alcohol) with 4-aminobutyraldehyde dimethyl acetal. Reaction is accomplished by first dissolving the poly(vinyl alcohol) in water and then adding concentrated hydrochloric acid along with additional water. The reaction is conducted at a temperature of 80° C. for 4.5 hours. Following reaction the reaction product is cooled and the water removed on a rotary evaporator.

U.S. Pat. No. 5,380,403 discloses the use of amine functional polymers for improving the properties for recycled paper. Amine functional poly(vinyl alcohols) are suggested. These polymers are formed by the copolymerization of vinyl acetate and N-vinylformamide followed by hydrolysis of the resulting polymer. Another polymer is formed by reacting 4-aminobutyraldehyde dimethyl acetal with poly(vinyl alcohol) to form the 4-aminobutyral of poly(vinyl alcohol). Regarding the latter procedure, the reaction of "[a]mino aldehydes would not be useful as the aldehyde and amine groups are self reactive."

BRIEF SUMMARY OF THE INVENTION

This invention relates to a process for producing an aminoalkylal derivative of polymer containing a plurality of pendent hydroxyl groups that are vicinal or on alternating carbon atoms, typically a derivative of a polymer having polymerized vinyl alcohol units. Preferably the alkylal derivative is the 4-aminobutyral of poly(vinyl alcohol). In contrast to prior art processes employing aminoalkylaldehyde alkylacetals as a reactant with poly(vinyl alcohol), for example, the improved process for the aminoacetalization of such polymers described herein comprises reacting a 5 of 6 member cyclic imine of the structure

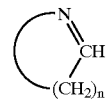

wherein n in an integer from 3 to 4 with the polymer containing a plurality of hydroxyl groups which are vicinal or on alternating carbon atoms such as in polymers having a plurality of polymerized vinyl alcohol units. In a preferred reaction, 1,2-pyrroline is reacted with the polymer containing polymerized vinyl alcohol units under acidic conditions. Preferably the reaction is carried out by a slurry phase process employing a nonsolvent carrier such as methanol for the poly(vinyl alcohol). The reaction scheme for preparing the 4-aminobutyral of poly(vinyl alcohol) may be characterized by the following equation.

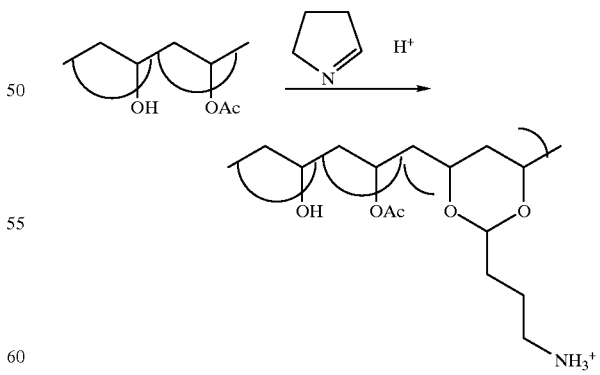

There are several advantages associated with the process and these include:

an ability to specifically produce the 4-aminobutyral of poly(vinyl alcohol) by the reaction of the imine with the polymer;

an ability to effect the amino acetalization of poly(vinyl alcohol) under slurry phase conditions which lends itself to the use of simple equipment for reaction and product recovery;

an ability to achieve acceptable reaction rates and conversions; and, an ability to utilize low cost 1,2-pyrroline precursors such has pyrrolidine and 1,4-butanediamine.

DETAILED DESCRIPTION OF THE INVENTION

For purposes of discussion herein the formation of aminoalkylals of polymers having a plurality of hydroxyl groups that are vicinal or on alternating carbon atoms by the reaction of a cyclic imine of the formula:

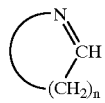

where n is 3 or 4 with such polymers will be discussed through the reaction of 1,2-pyrroline as the cyclic imine and poly(vinyl alcohol). The 1,2-pyrroline is a self-reaction product of 4-aminobutyraldehyde.

Polymers containing polymerized vinyl alcohol units can be formed by the polymerization of vinyl or acrylic esters with the ester unit containing from 1 to 4 carbon atoms. These pendent ester groups, when hydrolyzed, form polymers containing what can be referred to as polymerized vinyl alcohol units. One class of polymers containing polymerized vinyl alcohol units are based upon hydrolyzed vinyl acetate polymers wherein vinyl acetate itself is polymerized as a homopolymer or in conjunction with other monomers to form copolymers. The mole percentage of vinyl acetate should be sufficient to provide sufficient hydroxyl functionality to permit reaction with the cyclic imine and provide sufficient levels of amine functionality to the polymer. Typically the vinyl ester or vinyl acetate will comprise from 60 to 100% of the copolymer, preferably at least 90 mole percent of the polymer. Poly(vinyl alcohols) which can be employed in the reaction can be prepared from vinyl acetate homopolymers and copolymers having a weight average molecular weight generally ranging from 5000 to 300,000 and having hydrolysis values of from 85 to 99 mole %. Preferred poly(vinyl alcohols) have a hydrolysis value ranging from about 85 to 90 mole % and a weight average molecular weight ranging from 10,000 to 200,000.

A variety of monomers may be copolymerized with vinyl acetate to produce polymers containing vinyl alcohol units. Monomers which can polymerized with vinyl esters, and preferably vinyl acetate, include ethylene, unsaturated acids such as maleic, acrylic and methacrylic acid and esters such as the $C_1$–$C_{12}$, preferably from $C_1$ to $C_6$, alkyl esters of acrylic and methacrylic acid. In many instances, these polymers can be hydrolyzed to produce different grades of poly(vinyl alcohol) including for example the control of the hydrolysis function such that the only the vinyl ester is hydrolyzed, leaving, for example, the acrylic ester functionality intact. Other monomers having from 2–12 carbon atoms such as alkyl maleates, e.g., dibutyl maleate and the like may be polymerized as desired with the vinyl acetate to control hydrophilic and hydrophobic content.

Vinyl acetate and other polymerizable monomers can be polymerized by a variety of techniques well known in the art to produce precursors to the polymers containing a plurality of vinyl alcohol units which are alternating carbon atoms. These include emulsion, suspension and solution polymerization. Vinyl acetate polymers normally prepared for conversion to poly(vinyl alcohols) are prepared by solution polymerization. A solvent such as methanol is employed in such solution polymerization.

Hydrolysis of vinyl acetate homopolymers and copolymers of vinyl acetate and/or copolymers of vinyl esters such as vinyl acetate/ethylene and vinyl acetate and $C_1$–$C_{12}$ alkyl esters of acrylic and methacrylic acid can be effected using methods typically employed for the commercial hydrolysis of poly(vinyl acetate). Typically, this procedure involves the acid or base hydrolysis of the polymers containing ester groups yielding polymers having hydroxyl functionality on alternating carbon atoms and byproduct alcohol. Procedures for effecting polymerization of vinyl acetate and its subsequent hydrolysis to form poly(vinyl alcohol) polymers are described in the prior art set forth in the background of the invention and such prior art is incorporated by reference.

The reaction of 1,2-pyrroline with polymers containing polymerized vinyl alcohol units, particularly poly(vinyl alcohol) homopolymers derived by the homopolymerization of vinyl acetate can be carried out in solution or in a nonsolvent. In slurry phase processing of the polymer containing vinyl alcohol units, a nonsolvent is employed. (A solids content of from 10 to 40% by weight is typical.) Preferably, the reaction of poly(vinyl alcohol) with 1,2-pyrroline is carried in a nonsolvent capable of swelling the poly(vinyl alcohol) without effecting the substantial dissolution thereof. Lower alkyl alkanols such as methanol and ethanol or tetrahydrofuran are representative of these nonsolvents for use in slurry phase processing. The advantage of this process is that 1,2-pyrroline is sufficiently reactive with the swollen poly(vinyl alcohol) to permit formation of the aminobutyral derivative. When the reaction is complete, the product which is in solid form can be removed by simple filtration.

In effecting solution reaction, a partially or fully hydrolyzed poly(vinyl alcohol) is dissolved in water and reacted under the same conditions as in the slurry phase process. Separation of the polymer is achieved by addition of acetone and effecting precipitation of the reaction product.

To effect reaction between 1,2-pyrroline and polymers containing polymerized vinyl alcohol units, water must be present in a small but sufficient amount to permit reaction. Residue water in commercial grades of poly(vinyl alcohol) are sufficient to effect reaction. Rigorously dried poly(vinyl alcohol) displays poor reactivity with 1,2-pyrroline under slurry phase condition. The addition of up to 50 mole percent water (relative to the polymerized vinyl alcohol units) to slurries of commercial grade poly(vinyl alcohol) enhances reaction rate with minimal effect on achieved polymer conversion. Too high of a water level results in solubilization of the polymer and makes isolation of the product difficult.

The amount of cyclic imine such as 1,2-pyrroline necessary for effecting reaction with the polymer containing polymerized vinyl alcohol units generally will be within a range of from about 0.5 to 20 mole percent and preferably from about 1.5 to 10 mole percent based upon the molar percentage of polymerized vinyl alcohol units. This level results in a polymer having corresponding molar percentages of pendent amino alkylal functionality.

The reaction of the cyclic imine is an acid catalyzed reaction. Typically, the amount of acid necessary to effect reaction will range from 1.1 to 4 mole equivalents based upon the mole percentage of 1,2-pyrroline. At acid levels of 1.0 mole equivalents or less, no reaction will occur. Strong organic acids are preferred in effecting the reaction and representative examples include methane sulfonic acid, p-toluene sulfonic acid, trifluoroacetic acid and so forth. Inorganic acids such as hydrochloric acid may be used but no advantages are observed. Further, one desires to minimized the addition of water to the reaction medium.

Temperatures and pressures for effecting reaction between 1,2-pyrroline and polymers containing polymerized vinyl alcohol units range from 25 to 100° C. with pressures ranging from 1 to 50 atmospheres. Preferred conditions are 50–80° C. and 1 atmosphere.

The following examples are provided to illustrate embodiments of the invention. They are not intended to restrict the scope thereof.

EXAMPLE 1

Synthesis of 1,2-pyrroline.

To a stirred solution of 40.00 g (0.562 mole) of pyrrolidine, 44.96 g (1.124 mole) of NaOH, and 0.478 g (0.0028 mole) of silver nitrate in 600 mL of $H_2O$ at 0° C. was added dropwise a solution of 133.92 g (0.562 mole) of sodium persulfate in 200 mL of $H_2O$, being careful to maintain the temperature at less than 15° C. The addition typically required 1–1.5 h. The yellow reaction mixture was then stirred at 0° C for 2 h, resulting in a black slurry of copious crystalline solids. The solids were removed by vacuum filtration and the filtrate was extracted with three 500 mL portions of $CH_2Cl_2$. The combined organic layers were dried over $MgSO_4$, filtered, and concentrated to a dark yellow oil. To this residue was added ca. 300 mL of ether. The ether layer was decanted to remove insoluble sludge, dried over $MgSO_4$, filtered, and concentrated to a yellow oil. Purification by alumina column chromatography, eluting with ether, afforded 12.25 g (32% yield) of 1,2-pyrroline as a light yellow, foul-smelling oil. NMR analysis in $CDCl_3$ indicates a ca. 1:1.3 equilibrium mixture of monomeric and trimeric 1,2-pyrroline: $^1H$ NMR ($CDCl_3$) monomer $\delta$ 7.48 (s, 1 H, N=CH), 3.76–3.69 (m, 2 H, $NCH_2$), 2.44–2.38 (m, 2 H, $N=CHCH_2$), ca. 1.7 (m, 2 H, $CH_2$); trimer $\delta$ 2.92–2.85 (m, 6 H, $3\times NCH_2$), 2.23–2.16 (m, 3 H, $3\times NCH$), 1.82–1.56 (m, 12 H, $6\times CH_2$); $^{13}C$ NMR ($CDCl_3$) monomer $\delta$ 166.7, 60.9, 36.5, 20.2; trimer $\delta$ 81.5, 45.6, 27.5, 20.0; IR (vapor phase) monomer 2974 (CH), 1626 $cm^{-1}$ (C=N); Low Resolution MS monomer m/e 69.05.

The above procedure is a slight variation of that described in Ogawa, K.;Nomura, Y., Tomado, S., *J. Chem. Soc. Perkin Trans. I* 1982, 3031.

EXAMPLE 2

Solution Formation of 4-Aminobutyral of Poly (vinyl alcohol) Reaction of 1,2-Pyrroline with Poly (vinyl alcohol) in $H_2O$.

General Procedure

In this procedure, poly(vinyl alcohol) was added to a glass kettle reactor equipped with an overhead Teflon paddle or anchor stirrer, condenser, $N_2$-inlet, and septum. Water was added to afford a 10–17 wt. % polymer mixture. Then the mixture was heated to ca. 90° C. with stirring until a homogeneous solution was obtained. The reactor was then cooled to 80° C. and strong acid (1.2 mole equivalents relative to the 1,2-pyrroline to be used) was added, followed by the desired amount (typically from 1.5 to 10 moles based upon calculated hydroxyl functionality) of 1,2-pyrroline . The yellow solution was stirred under $N_2$ at 80° C. for 4 hours and was then allowed to cool. Solid polymer could be isolated by slowly pouring small quantities of reaction solution into a blender containing acetone. Repeated blending with fresh acetone was found to be critical for isolation of dry polymer. The solids were then collected via vacuum filtration and dried thoroughly in a vacuum oven at 50° C.

Although, the 4-aminobutyral of poly(vinyl alcohol) was produced, product isolation was difficult.

EXAMPLE 3

Slurry Process for Producing the 4-Aminobutyral of Poly(vinyl alcohol) Reaction of 1,2-Pyrroline with Poly(vinyl alcohol) in Methanol General Procedure In this typical procedure, poly(vinyl alcohol) was added to a glass kettle reactor equipped with an overhead anchor stirrer, condenser, $N_2$-inlet, and septum. Methanol (usually ca. 3× grams relative to PVOH) was added. The reactor was heated to 60 °C. in a constant temperature water bath. The desired amount of 1,2-pyrroline was added, as in Example 1, and the resulting mixture stirred for ca. 20–30 minutes. Then 1.2 equivalents (relative to 1,2-pyrroline) of strong acid was added. The reaction mixture was then stirred under $N_2$ at 60° C. for 7–14 hours. Upon cooling, polymer "fines" were removed via multiple decantation with methanol. The polymer product was isolated by vacuum filtration, followed by washing the solids with several portions of methanol. In some reactions, where severe polymer swelling (and/or slight dissolution) in methanol occurred, the reaction slurry was poured into a blender containing acetone, reblended with several fresh portions of acetone, and isolated via vacuum filtration. The isolated polymer product was dried in a vacuum oven at 50° C.

EXAMPLE 4

Formation of the 4-Aminobutyral of Poly(vinyl alcohol) by Reaction of 1,2-Pyrroline with Poly (vinyl Alcohol) and Reaction of Aminobutyraldehyde Dimethyl Acetal with Poly (vinyl alcohol)

A key objective of this example was to compare the reaction between 1,2-pyrroline and poly(vinyl alcohol) (PVOH) to the known reaction of 4-aminobutyraldehyde dimethyl acetal (ABAA) and poly(vinyl alcohol) in the synthesis of 4-aminobutyral of poly(vinyl alcohol).

Table 1 lists head-to-head comparisons of PVOH functionalization carried out under a variety of conditions, using ABAA and 1,2-pyrroline as amination agents.

TABLE 1

ABAA and 1,2-Pyrroline To Amination of PVOH

| PVOH | Modifier | Modifier Load (mol %) | Solvent | Acid (Eq.) | Water Eq. | Rxn Time | Rxn Temp | $^{13}$C NMR Analysis Acetate | Acetal | Efficiency |
|---|---|---|---|---|---|---|---|---|---|---|
| A-205 | ABAA | 5 | MeOH | HCl (1.2) | 4 | 22 h | 60 C. | 6.7 | 1.6 | 32% |
|  | Pyrroline |  |  |  |  |  |  | 6.8 | 1.7 | 34% |
| A-523 | ABAA | 12 | MeOH | HCl (1.2) | 4 | 16 h | 60 C. | 4.6 | 9.7 | 80% |
|  | Pyrroline |  |  |  |  |  |  | 3.4 | 4.6 | 38% |
| A-205 | ABAA | 7.4 | MeOH | MeSO$_3$H (1.2) | 0 | 7 h | 60 C. | 4.2 | 2.9 | 39% |
|  | Pyrroline |  |  |  |  |  |  | 3.4 | 2.3 | 31% |
| A-205 | ABAA | 7.4 | MeOH | MeSO$_3$H (1.2) | 4 | 7 h | 60 C. | 6 | 2.6 | 35% |
|  | Pyrroline |  |  |  |  |  |  | 5.3 | 2.3 | 31% |
| A-205 | ABAA | 7.4 | MeOH | MeSO$_3$H (4) | 4 | 7 h | 60 C. | 1 | 4.2 | 57% |
|  | Pyrroline |  |  |  |  |  |  | 0 | 3.3 | 43% |
| A-205 | ABAA | 10 | H$_2$O | MeSO$_3$H (1.2) |  | 4 h | 80 C. | 7 | 6 | 60% |
|  | Pyrroline |  |  |  |  |  |  | 4.7 | 4.6 | 46% |
| A-540 | ABAA | 10 | H$_2$O | HNO$_3$ (1.2) |  | 4 h | 80 C. | 10.3 | 7.1 | 71% |
|  | Pyrroline |  |  |  |  |  |  | 5 | 3.2 | 32% |

*Efficiency refers to mol % loading as a percentage of theoretical loading.
**Acid and water are relative to moles of amination agent.

Airvol ® 205 poly(vinyl alcohol) has a hydrolysis value of from 87.0 to 89.0%, a 4% aqueous solution viscosity @ 20° C. of 5.2 to 6.2 (Mw of from ~31,000 to 50,000), and a pH of 4.5 to 6.5.
Airvol ® 523 poly(vinyl alcohol) has a hydrolysis value of from 87.0 to 89.0%, a 4% aqueous solution viscosity @ 20° C. of 23 to 27 (Mw of from ~35,000 to 146,000), and a pH of 4.0 to 6.0.
Airvol ® 540 poly(vinyl alcohol) has a hydrolysis value of from 87.0 to 89.0%, a 4% aqueous solution viscosity @ 20° C. of 45 to 55 (Mw of from ~125,000 to 186,000), and a pH of 4.0 to 6.0.

These data show key comparisons for Airvol-205 poly (vinyl alcohol), (low MW, partially hydrolyzed), functionalization in that both ABAA and 1,2-pyrroline can be used in either aqueous or heterogeneous methanolic systems to produce an amine-functionalized PVOH. In general, the use of 1,2-pyrroline in place of ABAA resulted in lower functionalization efficiency. For most experiments, 1.2 equivalents of acid (HCl, MeSO$_3$H, or HNO$_3$) relative to amination agent were used. When 4.0 equivalents of MeSO$_3$H were used, improvement in reaction efficiency was observed. The addition of water to heterogeneous methanolic reactions had a minimal impact on functionalization efficiency for ABAA and no impact for 1,2-pyrroline.

EXAMPLE 5

Effect of Hydrolysis Level of PVOH and Molecular Weight on Reaction Efficiency The effect of hydrolysis and weight average molecular weight of poly(vinyl alcohol) on polymer swelling and reactivity was studied by reacting 1,2-pyrroline with various grades of PVOH in methanol. Swelling was measured in terms of the percent volume increase of solid PVOH particles upon treatment with 0.5 M 1,2-pyrroline (7.4 mol % relative to polymerized vinyl alcohol units) and 1.2 equivalents of MeSO$_3$H and 4 equivalents of H$_2$O (relative to 1,2-pyrroline) in methanol at 60° C. for 1 hour. Polymer amination efficiency was measured after 7 hours of PVOH reaction under conditions identical to those used in the swelling experiments. The graph compares the values of PVOH swelling and amination efficiency for a range of PVOH grades.

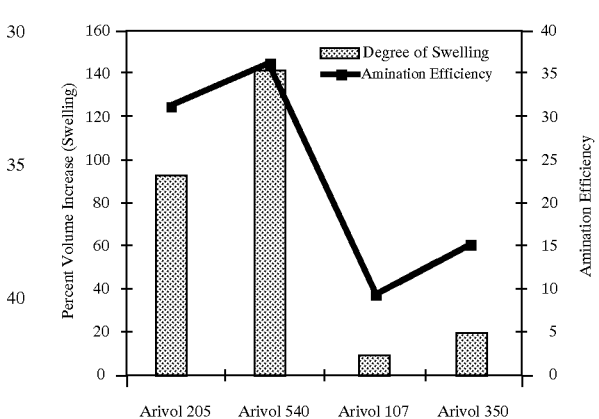

Arivol ® 205 poly(vinyl alcohol) has a hydrolysis value of from 87.0 to 89.0%, a 4% aqueous solution viscosity @ 20° C. of 5.2 to 6.2 (wt. average. Mw of from ~31,000 to 50,000), and a pH of 4.5 to 6.5.

Arivol ® 540 poly(vinyl alcohol) has a hydrolysis value of from 87.0 to 89.0%, a 4% aqueous solution viscosity @ 20° C. of 45 to 55 (wt. average. Mw of from ~124,000 to 186,000), and a pH of 4.0 to 6.0.

Arivol ® 107 poly(vinyl alcohol) has a hydrolysis value of from 98.0 to 98.8%, a 4% aqueous solution viscosity @ 20° C. of 5.5 to 6.6 (wt. average. Mw of from ~31,000 to 50,000), and a pH of 5.0 to 7.0.

Arivol ® 350 poly(vinyl alcohol) has a hydrolysis value of from 98.0 to 98.8%, a 4% aqueous solution viscosity @ 20° C. of 62 to 72 (wt. average. Mw of from ~124,000 to 186,000), and a pH of 5.0 to 7.0.

The graph sets forth a clear correlation between extent of PVOH swelling and 1,2-pyrroline reaction efficiency was demonstrated. Partially hydrolyzed PVOH grades (Airvol® 205 and Airvol® 540) swelled and were aminated by reaction with 1,2-pyrroline to much greater extents than fully hydrolyzed grades of PVOH (Airvol® 107 and Airvol® 350). In addition, high Mw grades of PVOH (Airvol® 540 and Airvol® 350) swelled and were aminated to slightly greater extents than low Mw grades of PVOH of comparable hydrolysis level (Airvol® 205 and Airvol® 107). These results demonstrate the importance of PVOH swelling and indicate that partially hydrolyzed grades of PVOH are preferred in the slurry phase reaction process.

What is claimed is:

1. In a process for the formation of an aminoalkylal derivative of a polymer having a plurality of hydroxyl groups that are vicinal or on alternating carbon atoms by reaction of an aminoalkylal acetal forming composition with said polymer, the improvement for forming said aminoalkylal derivative of said polymer which comprises:

reacting a cyclic imine of the formula:[ $N{:}CH(CH_2)_n$ }

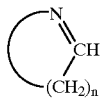

wherein n is a number of 3 to 4 with said polymer having a plurality of hydroxyl groups that are vicinal or on alternating carbon atoms in the presence of water and an acid catalyst.

2. The process of claim 1 wherein the cyclic imine is 1,2-pyrroline and the reaction is carried out in slurry phase.

3. The process of claim 2 wherein the polymer having a plurality of hydroxyl groups that are vicinal or on alternating carbon atoms is a poly(vinyl alcohol) derived by the solution polymerization of a monomer system comprised of vinyl acetate and the subsequent hydrolysis thereof.

4. The process of claim 3 wherein the poly(vinyl alcohol) is derived from a polymer having from 60 to 100 mole % polymerized vinyl acetate.

5. The process of claim 4 wherein the hydrolysis value of the poly(vinyl alcohol) is from 85 to 99 mole percent.

6. The process of claim 5 wherein the weight average molecular weight of the poly(vinyl alcohol) is from 10,000 to 200,000.

7. The process of claim 6 wherein the poly(vinyl alcohol) is derived from poly(vinyl acetate) homopolymer.

8. The process of claim 4 wherein the mole percent of 1,2-pyrroline reacted with the poly(vinyl alcohol) is from 0.5 to 20 mole percent based upon the molar percentage of polymerized vinyl alcohol units.

9. The process of claim 8 wherein the reaction of poly(vinyl alcohol) with 1,2-pyrroline is carried out under slurry phase conditions in the presence of methanol.

10. The process of claim 9 wherein the 1,2-pyrroline is reacted in an amount of from 1.5 to 10 mole percent based upon the molar percentage of polymerized vinyl alcohol units.

11. The process of claim 8 wherein the solids content of the slurry is from about 10 to 40% by weight.

12. The process of claim 7 wherein the hydrolysis value of the poly(vinyl alcohol) is from 85 to 90 mole %.

* * * * *